(12) United States Patent
Weiher (10) Patent No.: US 7,628,014 B2
(45) Date of Patent: Dec. 8, 2009

(54) HYDRAULIC TRANSMITTING DEVICE

(75) Inventor: Franz Weiher, Neustetten (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 282 days.

(21) Appl. No.: 11/897,076

(22) Filed: Aug. 29, 2007

(65) Prior Publication Data
US 2008/0053085 A1   Mar. 6, 2008

(30) Foreign Application Priority Data
Aug. 30, 2006   (DE) .................. 10 2006 041 956

(51) Int. Cl.
*B60T 7/08*      (2006.01)
*F15B 7/08*      (2006.01)
(52) U.S. Cl. ........................................ 60/594
(58) Field of Classification Search .............. 60/594; 92/13.7, 13.8
See application file for complete search history.

(56) References Cited
U.S. PATENT DOCUMENTS
5,636,518 A * 6/1997 Burgoyne et al. ............. 60/594
6,003,639 A * 12/1999 Buckley et al. ............... 188/26
6,957,534 B2 * 10/2005 Lumpkin ..................... 60/594

FOREIGN PATENT DOCUMENTS
DE   90 06 210    9/1990
DE   44 08 741    10/1994
EP   1 325 863    7/2003

* cited by examiner

Primary Examiner—Michael Leslie
(74) Attorney, Agent, or Firm—Lipsitz & McAllister, LLC (57) ABSTRACT

In order to create a hydraulic transmitting device for vehicles, in particular, for vehicles steered by handlebars, comprising a housing with a hydraulic master cylinder, in which a movable piston is arranged, an actuating lever movable relative to the housing and a push rod transferring movement of the actuating lever to the piston, wherein the push rod is supported on the actuating lever, wherein the push rod is adjustable in the direction of a longitudinal axis as a result of rotation about this axis and wherein the push rod can be secured relative to the actuating lever in specific rotary positions around the longitudinal axis by means of a locking device, with which the assembly thereof is less complicated it is suggested that the locking device comprise a locking element, that the locking element have at least one locking vane and that the at least one locking vane abut with a locking surface on a locking section of the push rod deviating from a circular cross section in a flexible manner and acted upon by a force.

36 Claims, 6 Drawing Sheets

HYDRAULIC TRANSMITTING DEVICE

The present disclosure relates to the subject matter disclosed in German application number 10 2006 041 956.1 of Aug. 30, 2006, which is incorporated herein by reference in its entirety and for all purposes.

BACKGROUND OF THE INVENTION

The invention relates to a hydraulic transmitting device for vehicles, in particular, for vehicles steered by handlebars, comprising a housing with a hydraulic master cylinder, in which a displaceable piston is arranged, an actuating lever movable relative to the housing and a push rod transferring movement of the actuating lever to the piston, wherein the push rod is supported on the actuating lever, wherein the push rod is adjustable in the direction of the longitudinal axis as a result of rotation about this axis and wherein the push rod can be secured in specific rotary positions around the longitudinal axis by means of a locking device.

Hydraulic transmitting devices of this type are known from the state of the art, for example, DE 44 08 741 A1.

The known solution does, however, have the disadvantage that its assembly is complicated.

The object underlying the invention is, therefore, to create a hydraulic transmitting device, with which the assembly thereof is less complicated.

This object is accomplished in accordance with the invention, in a hydraulic transmitting device of the type described at the outset, in that the locking device comprises a locking element, that the locking element has at least one locking vane and that the at least one locking vane abuts with a locking surface on a locking section of the push rod, which deviates from a circular cross section, in a flexible manner and acted upon by a force.

The advantage of the solution according to the invention is to be seen in the fact that, with it, the locking device is of a very simple design and easy to assemble since the locking element can be mounted in a simple manner as a uniform subassembly.

One embodiment of the solution according to the invention provides for the push rod to be accommodated in an internal thread of the locking device with a threaded section.

With this solution, the locking device can be rotatable altogether relative to the lever as long as the rotary position of the push rod relative to the internal thread of the locking device is maintained by the locking element since, in this case, there is no adjustment of the push rod in the direction of its longitudinal axis.

With respect to the rotation of the push rod in order to adjust this in the direction of the longitudinal axis, it is, however, favorable when the locking device is connected non-rotatably to the lever since, as a result, any co-rotation of the locking device during the rotation of the push rod can be prevented in a simple manner.

Another, advantageous solution provides for the push rod to be accommodated in an internal thread of a bearing member with a threaded section.

In this respect, it is particularly favorable for the support of the push rod on the actuating lever when the push rod is supported on the actuating lever by the bearing member.

In order to prevent any rotation of the push rod relative to the bearing member having the internal thread in an advantageous manner, it is preferably provided for the locking device to comprise a locking element which is connected non-rotatably to the bearing member so that the push rod can be secured relative to the bearing member in specific rotary positions around the longitudinal axis.

In this respect, the unit consisting of locking element and bearing member could be freely rotatable relative to the lever.

It is, however, particularly favorable when the bearing member or the locking element or both are connected non-rotatably to the lever.

With respect to the design of the locking element, different possibilities are conceivable.

One advantageous solution, for example, provides for the locking element to be designed so as to engage essentially around the locking section.

With respect to the number of locking vanes, no further details have so far been given. It is, in principle, sufficient to provide one locking vane.

It is particularly favorable when the locking element has several locking vanes.

The several locking vanes are preferably designed such that they abut on the locking section at several areas located at a distance from one another in circumferential direction.

One particularly favorable solution provides for the locking section to be located between two locking vanes.

In this respect, the locking vanes are preferably designed in the shape of shells in order to be able to accommodate the locking section between them.

One inexpensive solution provides for each locking vane to be designed as a partial section of a one-piece locking element member forming the locking element so that a locking element of this type can be produced particularly simply and, therefore, inexpensively.

In this case, the locking vanes are preferably designed such that they are fixed radially on a retaining area of the locking element member facing the bearing member and can be elastically moved radially to the longitudinal axis of the push rod with an end facing away from the bearing member.

Another, advantageous solution provides for the locking element to comprise at least one locking vane and a support area supporting it.

In this respect, the locking vane is preferably not integrally formed on a locking element member in one piece but rather designed such that the locking vane is an arm of a U-shaped spring clip.

With respect to the design of the locking section in detail, no further particulars have so far been given.

In general, the locking section can be designed such that it has radially projecting areas and between them areas which are set back radially.

In the simplest case, the radially projecting areas are formed by edges.

With respect to the areas which are set back radially, no further details have likewise been given. For example, the areas set back radially can be recesses which extend between the radially projecting areas, i.e., for example, the edges.

In the simplest case, the areas set back radially are, however, designed as flat sides of the locking section.

One particularly simple solution provides for the locking section to be designed in cross section as a polygon.

With respect to the connection between the locking element and the bearing member, no details have so far been given. One solution, for example, provides for the locking element to be securely connected to the bearing member, for example, by means of a form locking or a force locking connection.

One expedient embodiment provides for the bearing member to be inserted into a receiving means, for example, a receiving sleeve of the locking element.

It is, however, also conceivable to design the bearing member as an integral part of the locking sleeve.

One simple solution provides for the locking element to be designed so as to interlock with the bearing member.

In this case, the locking element is designed, for example, such that it has retaining clips interlockable with the bearing member.

In this respect, the retaining clips are preferably designed such that they engage around the bearing member on the circumferential side.

In conjunction with the preceding description of the individual embodiments, no further details have been given concerning the arrangement of the bearing member relative to the actuating lever.

One advantageous solution provides for the bearing member to be guided in a non-rotational manner in relation to the actuating lever so that the bearing member cannot turn relative to the actuating lever during the rotation of the push rod for the purpose of displacing it.

Furthermore, no further details have been given concerning the mounting of the bearing member on the actuating lever itself in conjunction with the preceding explanations concerning the individual embodiments.

In order to obtain an adequate path of movement for the displacement of the push rod for the actuation of the piston it is preferably provided for the bearing member to be supported on a pressure arm of the actuating lever.

Furthermore, it is preferably provided for the bearing member to be supported on the pressure arm so as to be pivotable so that the bearing member has the possibility of altering its alignment relative to the pressure arm when the piston is actuated.

Such a pivotable mounting of the bearing member may be realized in the most varied of ways.

One possibility provides for the bearing member to be mounted on the pressure arm by at least one rotary bearing.

An alternative solution for this provides for the bearing member to be supported on a guide surface of the pressure arm.

The support of the bearing member on the guide surface can facilitate an adequate degree of freedom for a pivoting movement of the bearing member and, therefore, of the push rod.

It is, however, particularly advantageous when the bearing member is guided in a non-rotational manner on the pressure arm by a guide element engaging on the pressure arm so that it is possible with this guide element to realize the pivotable arrangement of the bearing member relative to the pressure arm, on the one hand, and, on the other hand, to still secure the bearing member non-rotatably relative to the pressure arm in an adequately defined manner.

The guide element may be designed in the most varied of ways.

One solution which is particularly simple from a constructional point of view provides for the guide element to be guided on an outer surface of the pressure arm.

In order to ensure a defined pivoting movement by the guide element, it is provided, in addition, for the outer surface of the pressure arm to be designed as a guide surface cylindrical in relation to an axis so that a pivoting movement of the bearing member relative to the axis can be realized by the outer surface in conjunction with the guide element.

A further, advantageous embodiment of the transmitting device according to the invention provides for the locking element to have a receiving means for a protective bellows.

In this respect, it is preferably provided for a retaining ring of the protective bellows, which is radially elastic and can be fixed on the locking element, to act on the locking vanes in the direction of the locking section.

The retaining ring is expediently arranged such that it engages on the locking element in an end area facing away from the bearing member.

Additional features and advantages of the solution according to the invention are the subject matter of the following description as well as the drawings illustrating several embodiments.

DETAILED DESCRIPTION OF THE INVENTION

Figure 1:
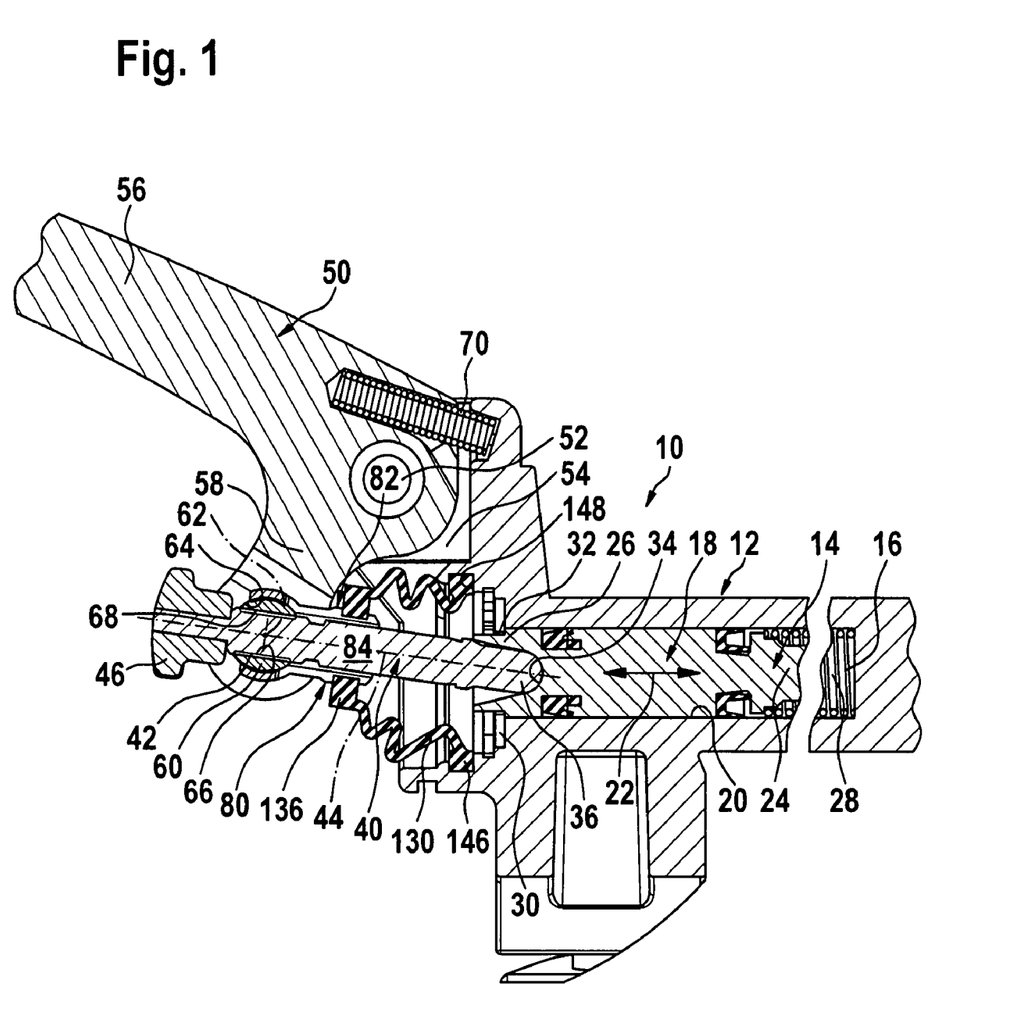
FIG. 1 shows a longitudinal section through a transmitting device according to the invention with a locking element in accordance with the first embodiment.

One embodiment of a transmitting device 10 for vehicles according to the invention, in particular, for vehicles steered by handlebars comprises a housing 12 which can be mounted on handlebars of the vehicle and in which a master cylinder is provided which is designated as a whole as 14 and has a cylinder chamber 16 and a piston 18, wherein the piston 18 is guided in a piston bore 20 for movement in a direction of displacement 22 and has a pressure side 24 facing the cylinder chamber 16 as well as an actuating side 26 facing away from the pressure side 24.

The piston 18 is, in addition, acted upon by a pressure spring 28 which is arranged in the cylinder chamber 16 and acts on the pressure side 24 such that the piston endeavors to move in the direction of displacement 22 into an initial position allowing a maximum volume of the cylinder chamber 16. In this initial position, the piston 18 is held by a stop ring 30 which surrounds the piston 18 on the actuating side 26 and on which the piston 18 can abut with a step 32.

On the actuating side 26, the piston 18 is provided with a recess 34 which is, in cross section, similar to a parabola and in which a head 36 of a push rod designated as a whole as 40 engages, the push rod serving to transfer an actuating movement which can be generated by a hand-operated lever 50 to the piston 18.

The hand-operated lever 50 is, for its part, mounted via a joint 52 on the housing 12, preferably on two bearing flanges 54 of the housing 12, and extends away from the joint 52 with an actuating arm 56.

Furthermore, the hand-operated lever 50 comprises a pressure arm 58 which extends approximately transversely to the actuating arm 56 and on which a bearing member 60 is mounted so as to be pivotable about a pivot axis 62, wherein the bearing member 60 passes through a respective bearing bore 64 in the pressure arm 58, for example, in each of two flange areas 65 of the pressure arm 58 extending at a distance from one another and, as a result, is mounted on either side by a respective rotary bearing 63.

The bearing member 60 further comprises a bore 66 which extends transversely to the pivot axis 62, has an internal thread 68 and is penetrated by the push rod 40.

For this purpose, the push rod 40 has a threaded section 52 which engages in the internal thread 68 such that the push rod 40 can be displaced transversely to the pivot axis 62 of the bearing member 60 during rotation about its longitudinal axis 44 and, as a result, a distance of the head 36 of the push rod 40 from the bearing member 60 can be adjusted.

For the purpose of rotating the push rod 40, this bears a hand-operated wheel 46 on its side of the threaded section 42 located opposite the head 36 and this wheel is, therefore, also arranged on a side of the bearing member 60 located opposite the head 36.

By rotating the push rod 40, a response of the master cylinder 14 as a function of the position of the actuating arm 56 of the hand-operated lever 50 can be adjusted, wherein the hand-operated lever 50 is preferably acted upon, in addition, by a pressure spring 70 which always keeps the hand-operated lever 50 pivoted to such an extent that the push rod 40 abuts in the recess 34 with its head 36 free from clearance and, therefore, pivoting of the hand-operated lever 50 proceeding from the non-actuated position directly results in displacement of the piston 18, with a reduction in the size of the cylinder chamber 16.

In order to prevent any unintentional alteration of the adjustment of the push rod 40 once carried out, this adjustment corresponding to the non-actuated position of the hand-operated lever 50, a locking device designated as a whole as 80 is provided.

The locking device 80 comprises a locking element 82 which is connected non-rotatably to the bearing member as well as a locking section 84 of the push rod 40 which is located between the threaded section 42 and the head 36 of the push rod and has, in relation to the longitudinal axis 44, a shape deviating from a rotationally symmetric shape; it is designed, for example, as a multiple sided member.

Figure 2:
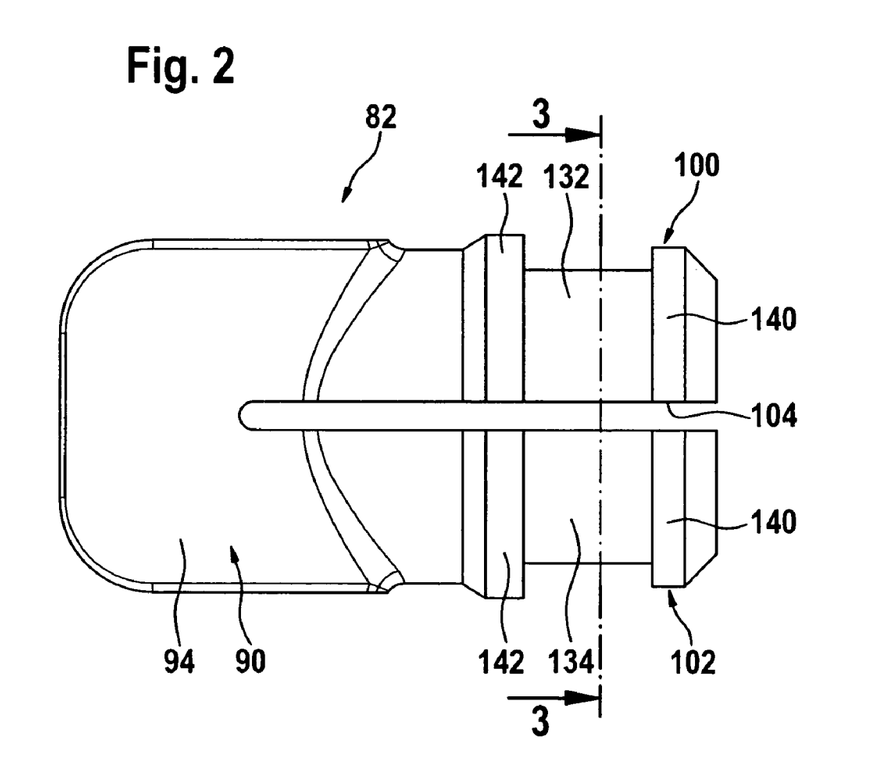
FIG. 2 shows a plan view of the first embodiment of the locking element according to the invention.
Figure 3:
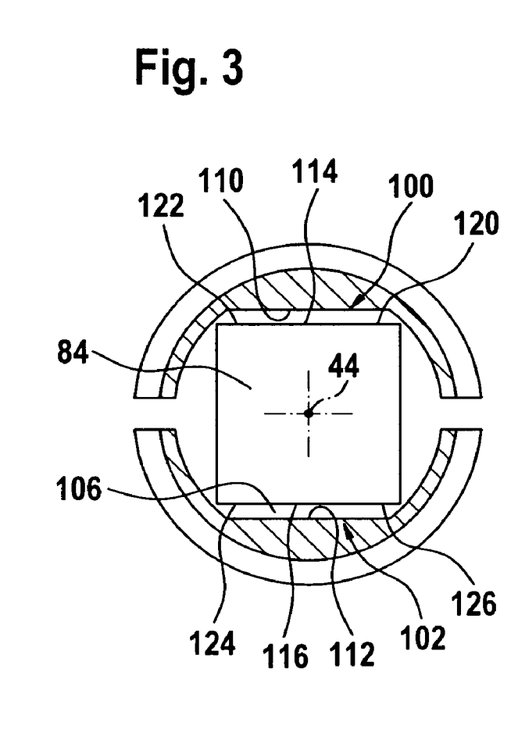
FIG. 3 shows a section along line 3-3 in FIG. 2.
Figure 4:
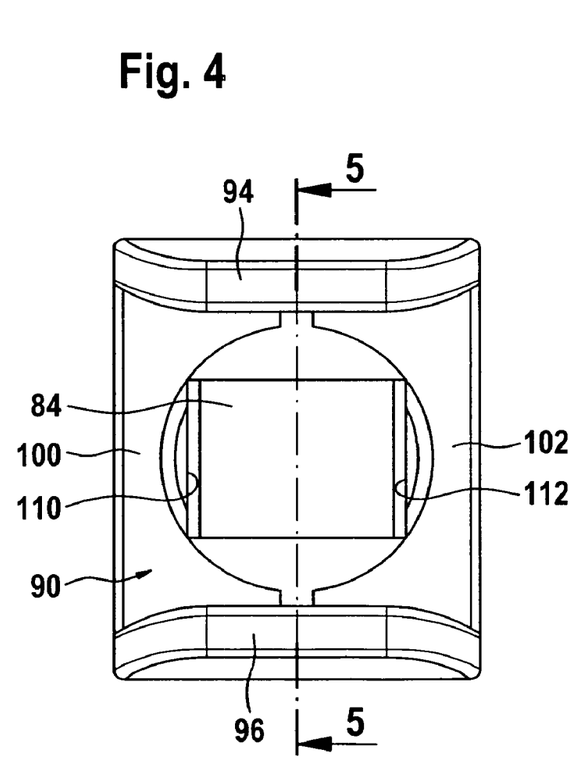
FIG. 4 shows a view of the first embodiment of the locking element looking from the bearing member.
Figure 5:
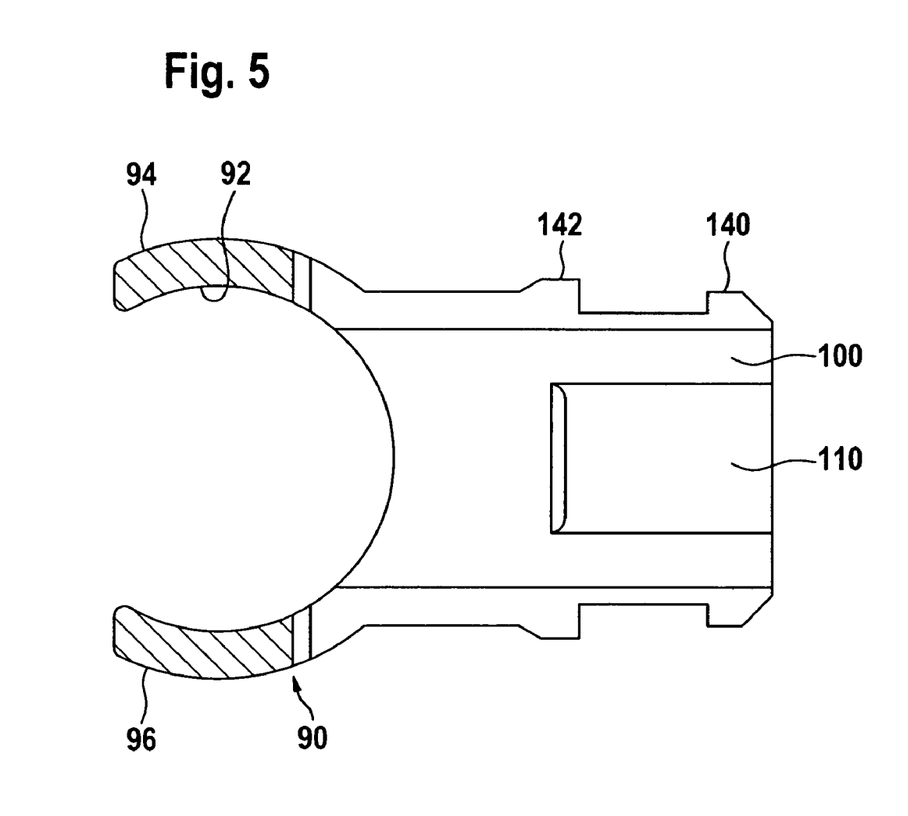
FIG. 5 shows a section along line 5-5 in FIG. 4.

A first embodiment of a locking element 82, illustrated in FIGS. 2 to 5, comprises a retaining area 90 which, as illustrated in FIGS. 2, 4 and 5, has a receiving means 92 for the bearing member 60, wherein the receiving means 92 is formed by retaining clips 94, 96 which are in a position to engage around the bearing member 60 on its outer circumference and, therefore, to fix the locking element 82 relative to the bearing member 60.

Locking vanes 100, 102 designed in the shape of half shells extend from the retaining area 90, these vanes extending away from the retaining area 90 directly proceeding from the retaining clips 94, 96 and being separated from one another by a space 104 such that the two locking vanes 100, 102 are merely connected to one another via the retaining clips 94, 96.

The locking vanes 100, 102 enclose a receiving space 106, in which the locking section 84 of the push rod 40 extends, and have, in addition, locking surfaces 110, 112 which border on the receiving space 106 and face it and, for the purpose of interlocking with the locking section 84, abut on oppositely located flat sides 114, 116 of the locking section 84 which is designed in cross section as a multiple sided member in order to fix the push rod 40 non-rotatably in relation to the longitudinal axis 44 between the locking vanes 100, 102, as a result.

On account of the space 104, the locking vanes 100, 102 do, however, have the possibility of deflecting radially in relation to the longitudinal axis 44 and so it is possible to adjust the push rod 40 as a result of rotation thereof about the longitudinal axis 44, wherein the edges 120 and 122 or 124 and 126, respectively, of the locking section 84, which are located to the side of the flat sides 114, 116, move over the locking surfaces 110, 112 and move the locking vanes 100, 102 apart for such a time until the next flat sides 114, 116 again face the locking surfaces 110, 112.

In order to fix a protective bellows 130 on the locking element 82, the locking vanes 100, 102 are provided with receiving means 132, 134 for a retaining ring 136 in the area of their ends facing away from the retaining area 90, wherein the receiving means 132, 134 are preferably designed as recesses each limited by an edge bead 140, 142.

The protective bellows 130 extends from the retaining ring 136 as far as a retaining ring 146 which engages in a receiving means 148 in the housing 12.

Figure 6:
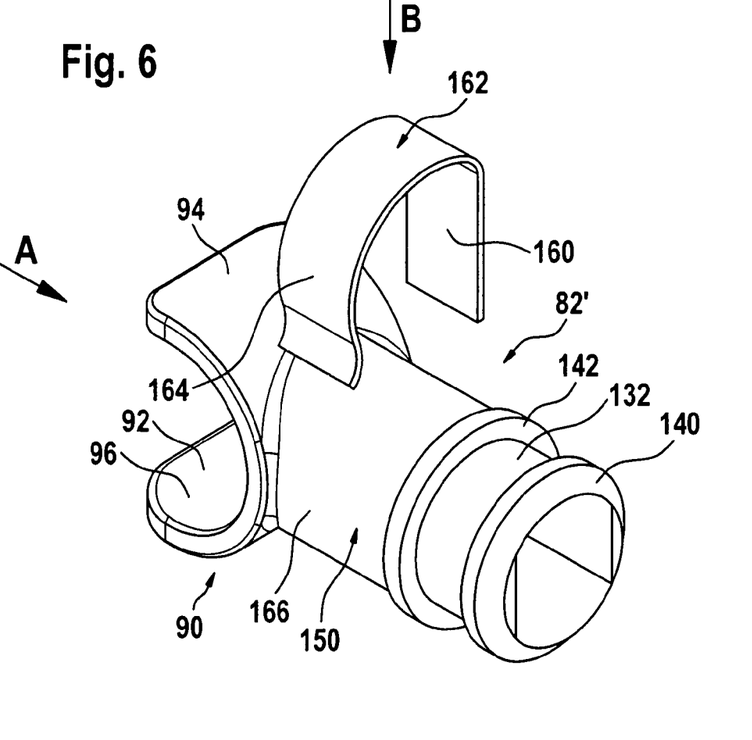
FIG. 6 shows a perspective illustration of a locking element of a second embodiment of a transmitting device according to the invention.
Figure 7:
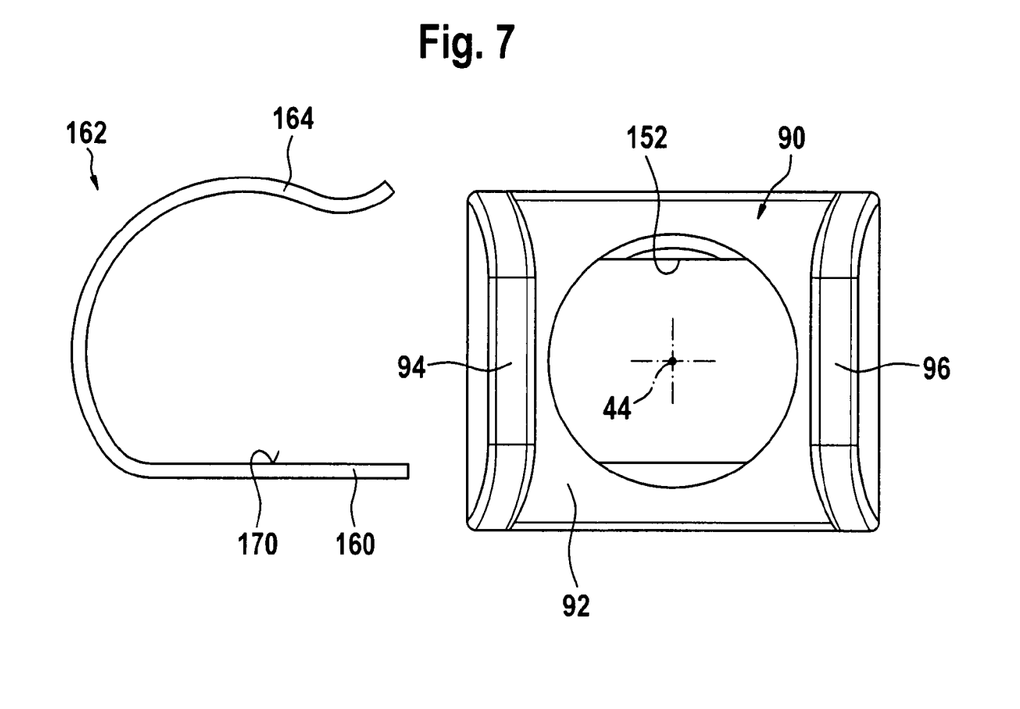
FIG. 7 shows a view of an operating element in accordance with a second embodiment of the transmitting device according to the invention in the direction of arrow A in FIG. 6.
Figure 8:
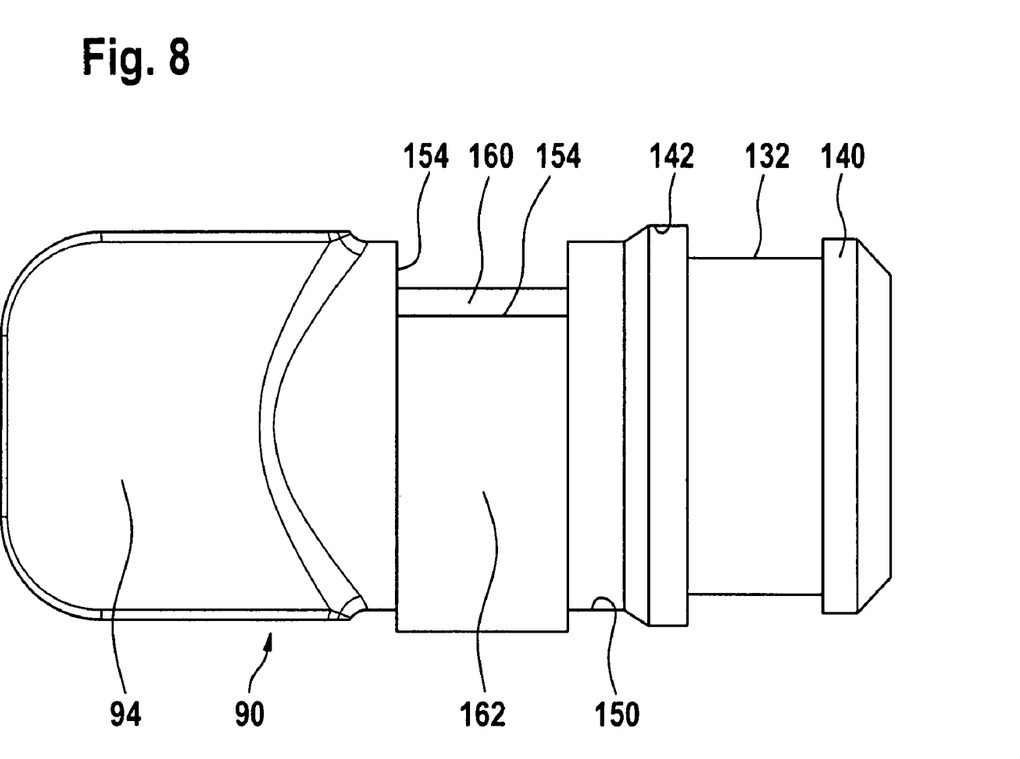
FIG. 8 shows a view of the locking element of the second embodiment of the transmitting device according to the invention looking in the direction of arrow B in FIG. 6

In the case of a locking element 82' of a second embodiment of a transmitting device according to the invention, illustrated in FIGS. 6 to 8, those parts which are identical to those of the preceding embodiment are given the same reference numerals and so, with respect to the description thereof, reference can be made in full to the comments on the first embodiment.

The retaining area 90 of the locking element is, in particular, designed in the same way as in the first embodiment and comprises the retaining clips 94 and 96 which form the receiving means 92 for the bearing member 60.

In contrast to the first embodiment, a support area 150, which surrounds a passage 152 which is penetrated by the push rod 40 with its locking section 84, extends from the retaining area 90.

The support area 150 is preferably of a sleeve-like design and comprises on one side a lateral opening 154, through which a locking vane 160 engages, wherein the locking vane 160 narrows the passage 152 on one side in such a manner that the locking vane 160 abuts on one of the flat sides 114, 116 of the locking section 84 and, therefore, prevents any rotation of the locking section 84 in the passage 152.

The locking vane 160 forms an arm of a spring clip 162 which is altogether of an approximate U shape and the other arm 164 of which rests on an outer side 166 of the support area 150 located opposite the opening 154 and, therefore, forms a support for the locking vane 160 so that the locking vane 160 engages in the passage 152 via the opening 154 pretensioned by the U-shaped spring clip 162 in an elastic manner in the direction of the longitudinal axis 44 of the push rod 40.

As a result, a rotation of the push rod 40 with its locking section 84 is likewise possible, wherein, in this case, the edges 120 to 126 can likewise be moved over a locking surface 170 of the locking vane 160 whilst the locking vane 160 bends radially outwards.

In the same way as in the first embodiment, the second embodiment of the locking element 82' according to the invention also comprises the one circumferential receiving means 132 limited by a respective edge bead 140 and 142 for the retaining ring 146 of the protective bellows 130.

Therefore, the locking element 82' of the second embodiment functions altogether in the same way as the first embodiment of the locking element 82 and so with respect to its further description reference can be made in full to the comments on the first embodiment.

Figure 9:
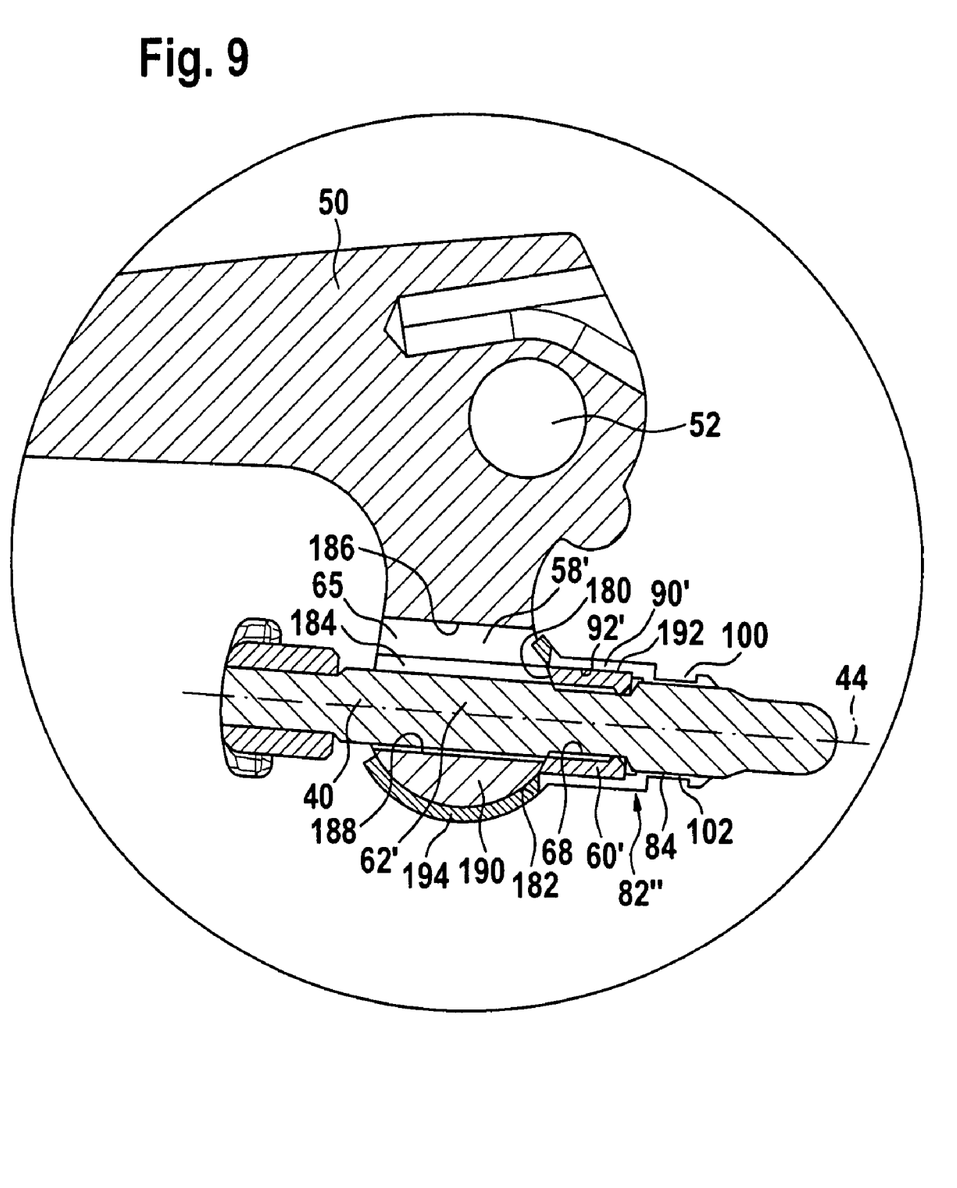
FIG. 9 shows an enlarged detailed longitudinal section similar to FIG. 1 though a third embodiment of a transmitting device according to the invention.

In a third embodiment of a hydraulic transmitting device according to the invention, illustrated in FIG. 9, those elements which are identical to those of the first embodiment are given the same reference numerals and so with respect to the description thereof reference can be made in full to the comments on the preceding embodiments.

In contrast to the preceding embodiments, the bearing member 60' of the third embodiment is not arranged between the flange areas 65 of the pressure arm 58' but rather is designed as a threaded sleeve with the internal thread 68 which rests with an end side 180 on an outer guide surface 182 of the pressure arm 58', wherein the outer guide surface 182 is formed by the two flange areas 65.

In the third embodiment, the push rod 40 extends through a passage 184 which is located between the flange areas 65, merely guides the push rod 40 on both sides, however, and allows any optional tilting of the push rod in a plane of movement of the push rod 40 lying approximately parallel to the flange areas 65 and located in the plane of drawing in FIG. 9, wherein the movement of the push rod 40 is, however, limited by wall areas 186 and 188 which extend transversely to the plane of movement. In this respect, the wall area 186 extends on a side of the push rod 40 facing the joint 52 whereas the wall area 188 extends on a side of the push rod 40 facing away from the joint 52 and is formed by a connecting web 190 which connects the two flange areas 65 to one another on the side of the push rod 40 facing away from the joint 52.

The connecting web 190 is preferably designed in one piece with the flange areas 65 and these are in one piece part of the hand-operated lever 50.

The bearing member 60' preferably has an outer contour 192 deviating from a circular shape, for example, in the shape of a multiple sided member and this is accommodated in the receiving means 92' of the locking element 82" designed as a receiving sleeve in a non-rotational manner, preferably in a form locking manner, so that the bearing member 60' is non-rotatably connected to the locking element 82", the locking vanes 100, 102 of which abut on the locking section 84 of the push rod 40 and, therefore, fix the push rod 40 in its rotary positions relative to the bearing member 60' against any free rotation.

Since, in this embodiment, the bearing member 60' rests only with its end side 180 on the guide surface 182, there is no securing of the bearing member 60', in particular, no non-rotational securing of the bearing member 60' relative to the pressure arm 58' of the hand-operated lever 50.

For this purpose, a guide element designated as a whole as 194 is provided in the third embodiment and this engages on the pressure arm 58'.

The guide element 194 is preferably integrally formed in one piece on the locking element 82", preferably in one piece on the retaining area 90' forming the receiving means 92', and engages around the pressure arm 58', however, such that the entire unit consisting of locking element 82" and bearing member 60' is pivotable about a virtual axis 62' relative to the pressure arm 58', wherein the virtual axis 62' extends at right angles to the plane of movement of the push rod 40 and, as in the first embodiment, is at right angles to the longitudinal axis 44 of the push rod 40.

Such a pivotability of the push rod 40 together with the locking element 82' and the bearing member 60' may be realized in the simplest way in that the guide surface 182 is designed as a surface extending cylindrically in relation to the virtual axis 62' and that the guide element 194 encompasses this guide surface 182 over an adequately large angular range with respect to the virtual axis 62'.

A particularly exact guidance is possible in that the guide element 194 encompasses the guide surface 182 of a cylindrical design over an angular range of more than 180° so that, as a result, a guide following the cylindrical shape of the guide surface 182 is provided for the unit consisting of locking element 82" and bearing member 60'.

Alternatively to the guide element 194 encompassing the guide surface 182 it would, however, also be conceivable to encompass the flange areas 65 on their outer sides facing away from the passage 184 and, as a result, to ensure that the unit consisting of locking element 82" and bearing member 60' is secured in a non-rotational manner.

In a further variation of the third embodiment, it would likewise be conceivable to secure the guide element 194 on the bearing member 60' and to fix the locking element 82" in a non-rotational manner on the bearing member 60'.

In the third embodiment illustrated, the bearing element 60' is a part separate from the locking element 82" but it is also conceivable to integrate the bearing element 60' into the locking element 82' and produce the two as a one-piece part.

The invention claimed is:

1. Hydraulic transmitting device for vehicles, in particular, for vehicles steered by handlebars, comprising a housing with a hydraulic master cylinder, a displaceable piston being arranged in said cylinder, an actuating lever movable relative to the housing and a push rod transferring movement of the actuating lever to the piston, the push rod being supported on the actuating lever, the push rod being adjustable in the direction of a longitudinal axis as a result of rotation about said axis and the push rod being securable relative to the actuating lever in specific rotary positions around the longitudinal axis by means of a locking device, the locking device comprising a locking element, the locking element having at least one locking vane and the at least one locking vane abutting with a locking surface on a locking section of the push rod deviating from a circular cross section in a flexible manner and acted upon by a force.

2. Transmitting device as defined in claim 1, wherein the push rod is accommodated in an internal thread of the locking device with a threaded section.

3. Transmitting device as defined in claim 2, wherein the locking device is connected non-rotatably to the lever.

4. Transmitting device as defined in claim 1, wherein the push rod is accommodated in an internal thread of a bearing member with a threaded section.

5. Transmitting device as defined in claim 3, wherein the push rod is supported on the actuating lever by the bearing member.

6. Transmitting device as defined in claim 4, wherein the locking device comprises the locking element connected non-rotatably to the bearing member such that the push rod is securable relative to the bearing member in specific rotary positions around the longitudinal axis.

7. Transmitting device as defined in claim 4, wherein the bearing member and/or the locking element are connected non-rotatably to the lever.

8. Transmitting device as defined in claim 1, wherein the locking element is designed so as to engage essentially around the locking section.

9. Transmitting device as defined in claim 1, wherein the locking element has several locking vanes.

10. Transmitting device as defined in claim 9, wherein the locking vanes abut on the locking section at several areas arranged at a distance from one another in circumferential direction.

11. Transmitting device as defined in claim 9, wherein the locking section is located between two locking vanes.

12. Transmitting device as defined in claim 11, wherein the locking vanes are designed in the shape of shells.

13. Transmitting device as defined in claim 9, wherein each locking vane is designed as a partial section of a one-piece locking element member forming the locking element.

14. Transmitting device as defined in claim 13, wherein the locking vanes are fixed radially on a retaining area of the locking element facing the bearing member and are elastically movable radially to the longitudinal axis with an end facing away from the bearing member.

15. Transmitting device as defined in claim 4, wherein the locking element comprises at least one locking vane and a support area supporting it.

16. Transmitting device as defined in claim 15, wherein the at least one locking vane is an arm of a U-shaped spring clip.

17. Transmitting device as defined in claim 1, wherein the locking section has radially projecting areas and between them areas set back radially.

18. Transmitting device as defined in claim 17, wherein the radially projecting areas are designed as edges.

19. Transmitting device as defined in claim 17, wherein the areas set back radially are designed as flat sides.

20. Transmitting device as defined in claim 17, wherein the locking section is designed in cross section as a polygon.

21. Transmitting device as defined in claim 1, wherein the locking element has a receiving means for the bearing member.

22. Transmitting device as defined in claim 21, wherein the bearing member is inserted into the receiving means.

23. Transmitting device as defined in claim 21, wherein the receiving means is connectable to the bearing member in an interlocking manner.

24. Transmitting device as defined in claim 23, wherein the receiving means has retaining clips interlockable with the bearing member.

25. Transmitting device as defined in claim 24, wherein the retaining clips engage around the bearing member on the circumferential side.

26. Transmitting device as defined in claim 1, wherein the bearing member is guided in a non-rotational manner in relation to the actuating lever.

27. Transmitting device as defined in claim 1, wherein the bearing member is supported on a pressure arm of the actuating lever.

28. Transmitting device as defined in claim 27, wherein the bearing member is supported on the pressure arm so as to be pivotable.

29. Transmitting device as defined in claim 28, wherein the bearing member is mounted on the pressure arm by at least one rotary bearing.

30. Transmitting device as defined in claim 27, wherein the bearing member is supported on a guide surface of the pressure arm.

31. Transmitting device as defined in claim 27, wherein the bearing member is guided on the pressure arm in a non-rotational manner by a guide element engaging on the pressure arm.

32. Transmitting device as defined in claim 31, wherein the guide element is guided on an outer surface of the pressure arm.

33. Transmitting device as defined in claim 32, wherein the outer surface is designed as a guide surface cylindrical in relation to an axis.

34. Transmitting device as defined in claim 1, wherein the locking element has a receiving means for a protective bellows.

35. Transmitting device as defined in claim 34, wherein a retaining ring of the protective bellows acts on the locking vanes in the direction of the locking section, said retaining ring being radially elastic and fixable to the locking element.

36. Transmitting device as defined in claim 34, wherein the retaining ring of the protective bellows engages on the locking element in an end area facing away from the bearing member.

* * * * *